United States Patent [19]
Hundleby

[11] Patent Number: 4,966,104
[45] Date of Patent: Oct. 30, 1990

[54] TWO-STROKE ENGINES

[75] Inventor: Giles E. Hundleby, Horsham, England

[73] Assignee: Ricardo Group PLC, Shoreham-by-Sea, England

[21] Appl. No.: 371,064

[22] Filed: Jun. 26, 1989

[30] Foreign Application Priority Data

Jun. 30, 1988 [GB] United Kingdom ............... 8815543

[51] Int. Cl.$^5$ .............................................. F02B 75/02
[52] U.S. Cl. ........................... 123/65 BA; 123/65 VA; 123/73 C
[58] Field of Search .......... 123/65 A, 65 BA, 65 VA, 123/65 P, 73 C, 73 CB, 73 CC, 73 SC, 73 SP

[56] References Cited

U.S. PATENT DOCUMENTS

| 842,392 | 1/1907 | Eckhard | 123/73 SP |
|---|---|---|---|
| 1,046,738 | 12/1912 | Cross | 123/73 SC |
| 1,424,965 | 8/1922 | Wells | 123/73 SC |
| 2,481,901 | 9/1949 | Bracke | 123/73 R |
| 2,503,642 | 4/1950 | Tilliet | 123/65 VA |
| 3,815,566 | 6/1974 | Staggs | 123/65 VA |
| 4,813,395 | 3/1989 | Daly et al. | 123/65 A |
| 4,838,214 | 6/1989 | Barrett | 123/42 |

FOREIGN PATENT DOCUMENTS

| 0172414 | 10/1983 | Japan | 123/73 SC |
|---|---|---|---|
| 168301 | 7/1922 | United Kingdom | 123/73 SC |

Primary Examiner—David A. Okonsky
Attorney, Agent, or Firm—McAulay Fisher Nissen & Goldberg

[57] ABSTRACT

A two-stroke engine comprises a cylinder which accommodates a piston and which has inlet and outlet ports, means for injecting fuel into the cylinder and control means for controlling the amount of fuel injected. The engine also includes a vent passage communicating with the interior of the cylinder and a first valve which is arranged to prevent communication between the interior of the cylinder and the vent passage and is connected to be opened and closed in synchronism with movement of the piston. Situated in the vent passage downstream of the first valve is a second throttling valve which is coupled to the control means and is arranged to be opened to an increasing extent to permit an increasing proportion of the inlet charge to be discharged as the control means is operated to reduce the amount of fuel which is injected into the cylinder thereby achieving homogeneous combustion at a constant air fuel ratio.

10 Claims, 3 Drawing Sheets

TWO-STROKE ENGINES

The present invention relates to two-stroke engines of the type comprising a cylinder which accommodates a piston and which has inlet and outlet ports, means for injecting fuel into the cylinder and control means for controlling the amount of fuel injected by the fuel injection means, the engine including a vent passage communicating with the interior of the cylinder and valve means arranged to open to permit a proportion of the inlet charge to be discharged from the cylinder during the compression stroke of the piston. In such engines the inlet and exhaust ports are both open for a period whereby at the end of the working stroke of the piston the inlet charge of air and optionally fuel also displaces the majority of the remaining exhaust gas from the cylinder prior to the commencement of compression of the inlet charge. Such engines may be of the type in which the inlet charge is admitted directly into the cylinder or via the crankcase in which it is initially compressed during the first portion of the working stroke of the piston and subsequently displaced into the cylinder.

Two-stroke cycle engines are potentially very attractive for automotive use in that they are inherently very simple and small and have low frictional losses for a given power output. This results in low manufacturing cost and high fuel economy, particularly when installed in a vehicle specifically designed for a two-stroke engine, at the loads and speeds most frequently used in automotive applications. However, until recently the high levels of hydrocarbon emissions, oil consumption and exhaust smoke have been sufficient to discourage the use of two-stroke engines in automotive applications.

The development of electrically controlled direct fuel injection systems for petrol engines, firstly in the form of air-blast systems and then as fuel-only systems, has recently led to a renewed interest in two-stroke engines for automotive applications. This is because the direct injection of fuel into the cylinder permits the exhaust gases to be scavenged with air only and thus eliminates the risk of fuel being carried over into the exhaust system because the fuel is only injected after the exhaust port has closed. This reduces the fuel consumption and the emission of pollutants. Conventional four-stroke lubrication systems can therefore be adopted and the air can be supplied by an externally driven scavenge blower. This reduces oil consumption and thus exhaust smoke. It will be appreciated that it is the carry over of unburnt fuel and oil in the scavenging charge into the exhaust system which is responsible for many of the conventional disadvantages of two-stroke engines.

Most research work into advanced two-stroke engines using direct fuel injection has concentrated on so-called stratified-charge combustion systems in which a large quantity of exhaust gas remains in the cylinder to dilute the fresh charge when the engine is operating at low load. The adoption of the stratified-charge system results in the engine being very sensitive to the scavenging, fuel injection and mixing process and in general a considerable variation in the combustion characteristics is observed at light loads which results in higher fuel consumption and exhaust emission than that produced by stable combustion. In addition, stratified-charge engines can not be fitted with so-called three-way catalysts, i.e. combined oxidation and reduction catalysts, because rapid and complete combustion requires an excess of oxygen which results in an oxygen-rich exhaust gas which is unsuitable for treatment by a three-way catalyst.

Homogeneous combustion, that is to say combustion in which the inlet charge is of uniform composition throughout the cylinder prior to the initiation of combustion, is thus preferred but is difficult to achieve at low loads. If the intake pressure is reduced at low loads, for instance by throttling the inlet, then the scavenging process becomes less effective thus leaving larger quantities of exhaust gas in the cylinder. This results in a non-homogeneous or stratified-charge at the time of combustion which makes the combustion process irregular and causes excessive exhaust emissions.

It is known to reduce the amount of air in the cylinder at the time of ignition by discharging a proportion of the inlet charge during the compression stroke. GB-A-4059 discloses a two-stroke engine with a spring-loaded relief or vent valve which may be opened by cylinder pressure to discharge a proportion of the inlet charge prior to ignition. The vent valve is linked to the engine throttle so that its degree of opening is an inverse function of the degree of opening of the throttle. The vent valve is therefore untimed and is open at all times of high pressure in the cylinder including the expansion stroke. This is of course highly undesirable and extremely wasteful of power.

DE-A-3228680 discloses a two-stroke engine with a vent passage including a rotating valve which is opened for a proportion of the compression stroke to discharge a portion of the inlet charge prior to the injection of fuel and closed when the piston covers the vent passage. The proportion of the inlet charge which is desirably discharged does in fact vary with the instantaneous power output of the engine but there is no disclosure in this specification of varying the timing at which the valve is opened. If the timing of this valve is indeed fixed the amount of air that is discharged will be too great when the engine is at, for instance, 80% load. If the timing of the opening of the valve is varied with the engine load this will necessitate a variable timing coupling which is complex, expensive and unreliable between the vent valve and the crankshaft. In any event, rotating valves are extremely unreliable, particularly when subjected to high temperatures. In addition, the direct exposure of this valve to the gases in the combustion space will result in the valve becoming progressively clogged with combustion products and ultimately failing. The valve in this prior specification is situated a significant distance from the combustion space and the passage leading to it will constitute a "dead volume" which will significantly degrade the volumetric efficiency of the engine and result in an increase in the emission of pollutants.

It is therefore an object of the present invention to provide a scavenged two-stroke engine in which the combustion charge and thus the combustion process are substantially homogeneous regardless of the power output of the engine. In particular, it is the object of the invention to provide an engine of the type referred to above in which the disadvantages of the prior specifications are avoided and particularly the use of a rotating valve subject to clogging and failure and the provision of a dead space upstream of the valve means is avoided.

Thus according to the present invention a two-stroke engine of the type referred to above is characterised in that the valve means includes a first valve which is arranged to control communication between the interior of the cylinder and the vent passage and is connected to be opened and closed in synchronism with the movement of the piston and a second throttling valve which is coupled to the control means and is arranged to be opened to an increasing extent to permit an increasing proportion of the inlet charge to be discharged as the control means is operated to reduce the amount of fuel which is injected into the cylinder. The engine in accordance with the present invention permits the fresh charge of inlet/scavenging air to enter the cylinder at a pressure which is substantially constant regardless of the load to which the engine is subjected, i.e. the amount of fuel which is injected, but at loads less than full load subsequently reduces the amount of air in the cylinder by discharging some of it during the compression stroke, whereby the amount of air which is retained in the cylinder for combustion is matched to the amount of fuel which is injected.

When operating at or near full load the engine of the present invention operates in the usual manner and the second valve, which is aperiodic and does not open and close in synchronism with the cycle of the engine, is arranged to stay closed throughout the compression stroke but when operating at light load the second valve is arranged to be open by an amount which is inversely related to the amount of fuel being injected to vent or dump a proportion of the inlet air prior to the injection of the fuel. The first valve is positioned between the interior of the cylinder and the vent passage and there is thus no "dead volume". The first valve is not of the constantly rotating type but opens and closes in synchronism with the cycle of the engine. It is, however, not responsible for varying the proportion of the inlet charge which is discharged but permits access of the inlet charge to the second valve which fulfills this function. The first valve is closed before top dead centre and preferably before any of the fuel is injected into the cylinder and the amount of air remaining in the cylinder is thus matched to the amount of fuel which is injected. This results in the air fuel mixture being substantially homogeneous, even at low loads, whereby the combustion is also uniform and fuel consumption and the production of pollutants and smoke are reduced. Calculations have shown that the engine will operate both effectively and economically even if the first valve closes only 30° before the piston top dead centre position.

It will be appreciated that in the engine in accordance with the present invention the compression process proper only starts once the first valve has closed and thus when the engine is operating at a reduced load, which means that a significant amount of the inlet air is discharged, the maximum temperature of the compressed gases is significantly reduced. However, it is found that even if the first valve closes only 30° before TDC the gas temperature is sufficient for satisfactory combustion. Whilst the engine of the present invention effectively has a variable compression ratio its expansion ratio is of course totally unaffected by any reduction in the compression ratio which permits a significant quantity of power to be extracted from the burning fuel. Calculations show that the overall efficiency of the combustion process and thus of the engine itself are not significantly reduced by the reduction of the compression ratio.

The first valve may take various forms but it is preferred that it is of sleeve type, that is to say that is is a hollow cylindrical member which is disposed coaxially with the cylinder and in which an opening is formed which may be moved into and out of registry with an opening in the cylinder wall. Such a sleeve valve member might theoretically be positioned outside the cylinder wall but it is preferred that it is disposed within the cylinder and constitutes a cylinder liner. The sleeve valve member may be moved by any means but it is preferred that it is connected to be moved by a drive which is connected to e.g. the crankshaft. It may be moved either in linear reciprocation parallel to the cylinder axis or in arcuate reciprocation about the cylinder axis but it is preferred that its movement is in fact a combination of these two movements, that is to say that each point on the hollow cylindrical member describes an orbital motion. Such valves are known in engines and are disclosed per se in e.g. GB-A-Nos. 223121, 274564 and 279176, to which attention is directed for further details, particularly of the actuating mechanism.

Whilst the invention is applicable to two-stroke engines of single cylinder type it is particularly applicable to such engines of multi-cylinder type, e.g. for automotive use, in which each cylinder includes a vent passage and first and second valves, all the first valves being connected to be moved in unison and all the second valves being connected to be open to the same extent.

Further features and details of the invention will be apparent from the following description of certain specific embodiments which is given by way of example with reference to the accompanying diagrammatic drawings, in which.

Figure 1:
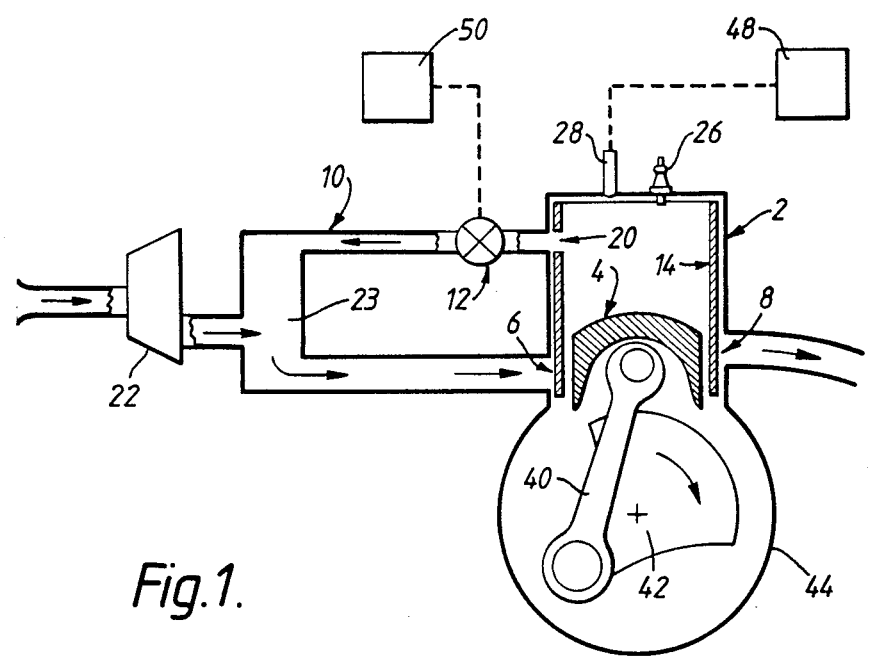
FIG. 1 is a vertical sectional view of one cylinder of a multi-cylinder two-stroke engine with the piston partway through the compression stroke.
Figure 2:
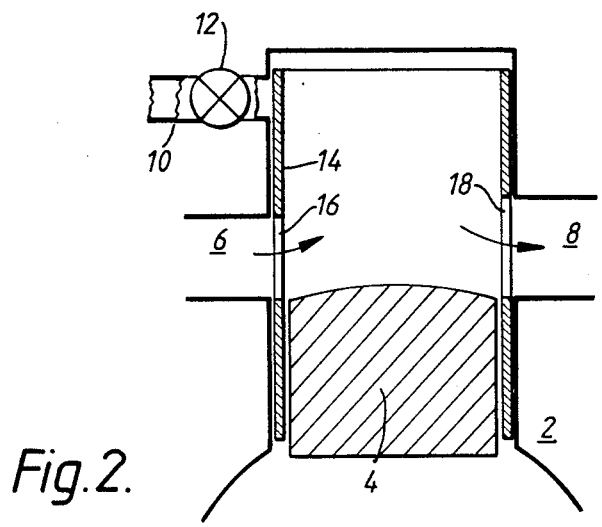
FIG. 2 is a view of the cylinder of FIG. 1 with the piston at the bottom dead centre position.

Referring firstly to FIGS. 1 and 2, the engine has a number of cylinders of which only one is illustrated and will be described. Each cylinder is defined by a cylinder wall 2 which slidably accommodates a piston 4 in the usual manner. The piston is connected via a connecting rod 40 to a crankshaft 42 in a crankcase 44, all of which are well known per se. In the cylinder wall 2 there is an inlet port 6 and an exhaust port 8 which are positioned to be sequentially covered and uncovered as the piston reciprocates within the cylinder. Connected to the inlet port 6 via a plenum 23 is a scavenging blower 22 of known type. Situated at the upper end of the cylinder is a spark plug 26 and a direct fuel injector 28 controlled by an electronic controller 48. Extending through the upper portion of the cylinder wall is a vent passage 10 which accommodates a variable throttle valve 12 and is arranged to communicate with the interior of the cylinder, as will be described below. The position of the throttle valve is set by a vent controller 50 in dependence on the amount of fuel which is injected into the engine and for this purpose the controller 50 is connected to the controller 48 or to the fuel control lever or "throttle" of the engine. Situated within the cylinder is a hollow cylindrical valve member or sleeve 14 which is coaxial with the cylinder and situated between the cylinder wall and piston and thus effectively acts as a cylinder liner. Formed in the sleeve 14 are three apertures 16, 18 and 20 whose position corresponds to the ports 6 and 8 and the vent passage 10, respectively. The sleeve 14 is connected by a gear drive of known type to the crankshaft to be moved both linearly and in rotation so that each portion of it describes a generally orbital movement and the openings 16, 18 and 20 are brought into and out of registry with the ports 6 and 8 and the passage 10 at fixed times during the cycle of the engine.

In use, when the piston is at the bottom dead centre position, as shown in FIG. 2, the openings 16 and 18 are in registry with the ports 6 and 8 and air enters the cylinder via the inlet port and displaces or scavenges the exhaust gases into the exhaust system. As the piston performs its compression stroke the sleeve 14 is moved to cover the ports 6 and 8 and to expose the vent passage 10. The vent passage 10 remains open throughout the majority of the upstroke of the piston, as shown in FIG. 1, thereby allowing some of the inlet charge of air to be returned to the plenum 23 to which the vent passage is connected. At about 30°, or perhaps more, e.g. 60°, before top dead centre the sleeve 14 closes the vent passage 10 and the remaining air is then compressed. At about 30° before TDC fuel is injected into the cylinder and at or near the top dead centre position the fuel is ignited by the spark plug.

As mentioned above, the vent passage 10 includes a throttle valve 12 whose position is determined directly or indirectly by the fuel control lever or "throttle" of the engine, such that when the engine is on full load the throttle valve 12 is maintained fully closed and no air escapes from the cylinder whilst if the engine is on low load the throttle valve 12 is fully open and a substantial proportion of the inlet air is discharged through the vent passage prior to actual compression beginning thus leaving the engine at a minimum compression ratio with a minimum of air in the cylinder thereby giving minimum power. At engine loads between minimum and maximum the throttle valve 12 is partially open whereby some of the inlet charge of air is vented and the pressure in the cylinder rises prior to closing of the vent passage to a value somewhere between atmospheric and a value that would be expected if the vent passage were absent or fully closed, whereby the effective compression ratio of the engine is somewhere between the maximum and the minimum.

Thus at all engine loads, that is to say settings of the "throttle" the actual amount of air present in the cylinder at the initiation of combustion is matched to the amount of fuel that is injected whereby the air fuel mixture and the subsequent combustion are substantially homogeneous.

In the embodiment described above the inlet air is provided by a scavenger blower and vented back to the air inlet system. The inlet air may, however, be aspirated soley by movement of the piston and vented directly to the atmosphere or into the engine exhaust system.

Figure 3:
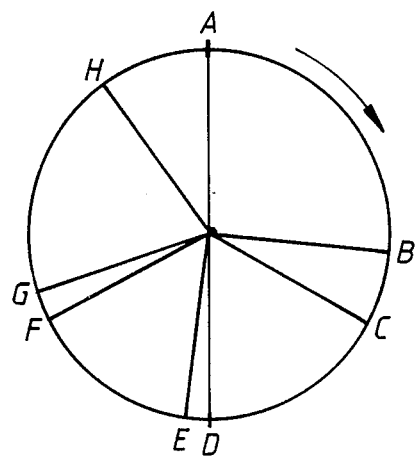
FIG. 3 is a timing diagram showing the timing of opening and closing of the inlet and exhaust ports and the vent passage.

A typical timing diagram for the engine of FIGS. 1 and 2 is shown in FIG. 3. The top dead centre position as shown at A and then moving in a clockwise direction the exhaust port is opened at B and exhaust gases escape into the exhaust system; the inlet port is opened at C and fresh air enters the cylinder displacing more of the exhaust gases in the exhaust system; after bottom dead centre at D the vent passage 10 is opened at E and the inlet charge of air continues to displace the exhaust gases in the exhaust system; the exhaust port is closed by the sleeve valve at F; the inlet charge continues to enter the cylinder via the inlet port and to escape via the vent and the inlet port is then closed either by the piston or by the sleeve valve at G; the inlet charge is compressed and/or escapes via the vent passage, depending on the setting of the throttle valve 12; the vent passage 10 is closed at H and fuel is injected and the compression process is then completed at A, shortly before which point the spark plug is actuated to initiate combustion.

Figure 4:
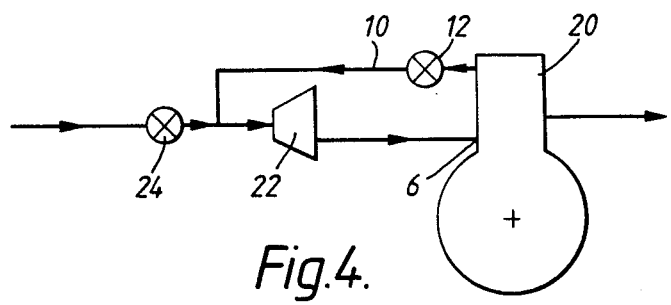
FIG. 4 is a schematic view of an engine with an alternative type of inlet system.

In order to ensure that the desired proportion of the inlet air is discharged through the vent passage, it is of course desirable for the back-pressure applied to the vent passage to be less than the pressure in the inlet port. One way of achieving this is shown in FIG. 4 in which the inlet to the scavenge blower 22 is provided with a throttle 24 which results in there being a low pressure between the throttle 24 and blower 22. The scavenge blower 22 does of course increase the pressure again to force the inlet charge into the engine. The vent passage 10 communicates with the inlet of the scavenge blower at a point downstream of the throttle 24.

Figure 5:
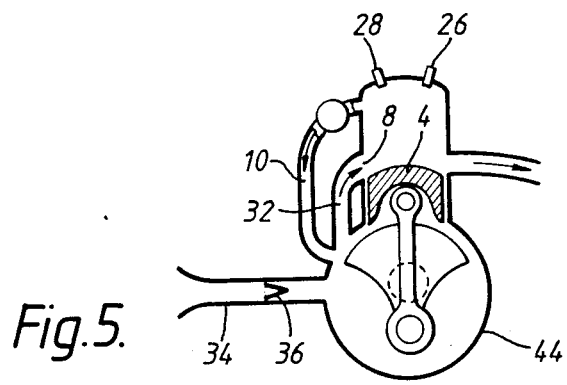
FIG. 5 is a schematic vertical section through a crankcase-scavenged engine in accordance with the invention.

A further construction is shown in FIG. 5 which illustrates an engine of crankcase-scavenged type. In this construction, from which, as in the case of FIG. 4, the sleeve valve has been omitted for the sake of simplicity, the space within the crankcase 30 is acted on by the piston and communicates with the inlet port 8 via a transfer passage 32 and also with the vent passage 10 and with an inlet duct 34 which includes a one-way valve 36, e.g. a Reed valve. This engine operates generally in the known manner whereby during the compression stroke of the piston air is drawn into the crankcase through the inlet duct 34 and is then subsequently compressed during the working stroke of the piston and then forced through the transfer passage 32 into the cylinder to act as the scavenging and combustion air. If the engine is operating at low load, air vented from the cylinder during the compression stroke is passed to the crankcase and thus recycled.

As mentioned above, the vent passage 10 is preferably positioned and the valve sleeve 14 so constructed that venting of the cylinder can continue until about 30° before top dead centre. The flow area of the vent passage should be sufficient to enable a substantial proportion of the inlet charge to leave at relatively low engine loads and thus the flow area of the passage is preferably between 25% and 125% of the area of the inlet port (which may of course in practice comprise an array of ports).

Figure 6:
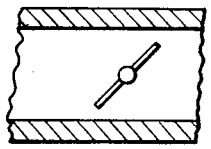
FIGS. 6, 7, 8 and 9 are views of four alternative constructions of the throttle valve in the vent passage.
Figure 7:
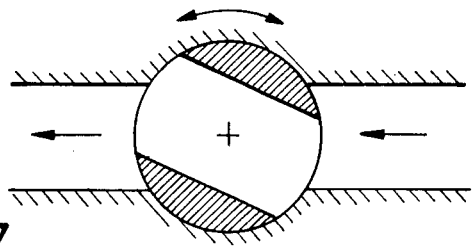
Figure 8:
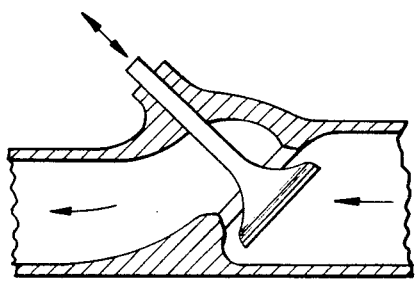
Figure 9:
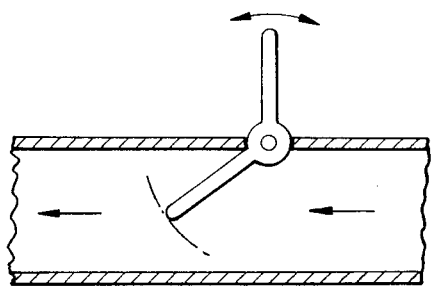

The throttling valve 12 may be of various types and in its simplest form may be a simple butterfly valve as shown in FIG. 6. Alternatively, it may be a barrel valve as shown in FIG. 7, a poppet valve as shown in FIG. 8 or a flap valve as shown in FIG. 9. In each case, however, the valve 12 is aperiodic, that is to say it does not open and close in synchronism with the engine's cycle and its degree of opening is determined only by the load to which the engine is subjected.

The valve of fixed timing which closes to separate the interior of the cylinder from the vent passage 10 may take various forms, but the provision of the valve sleeve 14 is associated with the benefit of asymmetrical timing of the opening and closing of the inlet and exhaust ports, as shown in FIG. 3, and ensures that the "dead volume"

between the throttle valve 12 and the cylinder does not communicate with the cylinder during the compression and expansion processes. Asymmetrical timing increases the volumetric efficiency of the air inlet process and reducing the "dead volume" reduces both fuel consumption and hydrocarbon emissions.

Whilst the invention is intended primarily for those engines with direct fuel injection it is not limited to such engines and could be used with engines of the type having a conventional carburettor provided that the vent passage is connected to the inlet pipe or to the crankcase.

Instead of the inlet and outlet ports being covered and uncovered by a sleeve valve, as described, or by the piston if the sleeve valve is omitted, it is also possible for the inlet and outlet to be controlled by respective poppet valves.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A two-stroke engine comprising a wall defining a cylinder, a piston reciprocally disposed within said cylinder, means defining an inlet port through which, in use, an inlet charge of air flows into said cylinder, means defining an outlet port through which, in use, the exhaust gas flows from said cylinder, means for injecting fuel into said cylinder and fuel control means for controlling the amount of fuel injected by said fuel injection means, said engine further including a vent passage communicating with the interior of said cylinder, first valve means which is arranged to control communication between the interior of said cylinder and said vent passage and is connected to be opened and closed at a predetermined point in the piston cycle, and a second valve means which is situated in said vent passage downstream of said first valve means and coupled to said fuel control means, said second valve means being a throttling valve which is arranged to be opened to an increasing extent to permit an increasing proportion of said inlet charge to be discharged through said vent passage as said fuel control means is operated to reduce the amount of fuel which is injected into said cylinder.

2. An engine as claimed in claim 1 wherein said first valve means is arranged to close said vent passage at a time which is at least 30° before the top dead centre position of said piston.

3. An engine as claimed in claim 1 wherein said fuel injection means is arranged to inject fuel into the cylinder at such a time that it is not discharged through said vent passage.

4. An engine as claimed in claim 1 wherein said first valve means comprises a hollow cylindrical member which is disposed coaxially with said cylinder which defines an opening and which may be moved into and out of registry with an opening in said cylinder wall.

5. An engine as claimed in claim 4 wherein said hollow cylindrical member is disposed within said cylinder and constitutes a cylinder liner.

6. An engine as claimed in claim 5, wherein said hollow cylindrical member is connected to be moved both linearly parallel to the axis of said cylinder and in rotation about the axis of said cylinder by a drive.

7. An engine as claimed in claim 1 further including a scavenging blower and an inlet plenum which is connected to said scavenging blower and inlet port, said vent passage communicating with said inlet plenum.

8. An engine as claimed in claim 1 further including a scavenging blower and a throttling valve, the outlet of said scavenging blower being connected to said inlet port, the inlet of said scavenging blower being connected to said throttling valve and said vent passage communciating with the inlet of said scavenging blower at a point downstream of said throttling valve.

9. An engine as claimed in claim 1 which is of crankcase-scavenged type and includes a crankcase and a transfer passage which connects said inlet port with the interior of said crankcase.

10. A two-stroke engine as claimed in claim 1 which is of multi-cylinder type, each cylinder including a vent passage, first valve means and second valve means, all the first valve means being connected to be moved in a predetermined phase relationship and all the second valve means being connected to be open to the same extent.

* * * * *